US012124708B1

(12) United States Patent
Rajani et al.

(10) Patent No.: US 12,124,708 B1
(45) Date of Patent: Oct. 22, 2024

(54) READ ONLY MODE HANDLING IN STORAGE DEVICES

(71) Applicant: WESTERN DIGITAL TECHNOLOGIES, INC., San Jose, CA (US)

(72) Inventors: Ankit Rajani, Bangalore (IN); Puspanjali Panda, Bangalore (IN); Ramkumar Muralidharan, Bangalore (IN)

(*) Notice: Subject to any disclaimer, the term of this patent is extended or adjusted under 35 U.S.C. 154(b) by 0 days.

(21) Appl. No.: 18/228,806

(22) Filed: Aug. 1, 2023

(51) Int. Cl.
  *G06F 12/00* (2006.01)
  *G06F 3/06* (2006.01)
(52) U.S. Cl.
  CPC .......... *G06F 3/0619* (2013.01); *G06F 3/0634* (2013.01); *G06F 3/064* (2013.01); *G06F 3/0679* (2013.01)
(58) Field of Classification Search
  CPC ...... G06F 3/0619; G06F 3/0634; G06F 3/064; G06F 3/0679
  See application file for complete search history.

(56) References Cited

U.S. PATENT DOCUMENTS

| | | | |
|---|---|---|---|
| 7,970,985 B2 | 6/2011 | Gonzalez | |
| 8,719,660 B2 | 5/2014 | Peng | |
| 9,582,220 B2 | 2/2017 | Samuels | |
| 11,456,050 B2 | 9/2022 | Chandramani | |
| 2017/0123682 A1* | 5/2017 | Sinclair | G06F 3/0611 |
| 2017/0228180 A1 | 8/2017 | Shen | |
| 2022/0012130 A1* | 1/2022 | Ki | G06F 12/1009 |
| 2022/0300376 A1* | 9/2022 | Bert | G06F 11/10 |

* cited by examiner

*Primary Examiner* — John A Lane
(74) *Attorney, Agent, or Firm* — Neal Blibo, LLC; Arlene P. Neal (57) ABSTRACT

A storage device ensures the use of a memory device with a degraded plane or die prior to the memory device entering a read-only mode. A controller on the storage device may write host data to a meta block formed in an interleaved manner using good blocks in planes on a first memory device. A virtual space manager may monitor dies and/or planes on the first memory device, determine that remaining good blocks on a first die and/or plane are equal to a minimum block threshold, and send a notification of a pending read-only mode on the first memory device. The notification may include an option to cease to perform write operations to the meta block, backup data on the first memory device, format the first memory device at half capacity and form additional meta blocks, and continue perform host write operations on the additional meta blocks.

20 Claims, 9 Drawing Sheets

READ ONLY MODE HANDLING IN STORAGE DEVICES

BACKGROUND

A host may transmit a command to read data from and/or write data to, for example, a flash memory device coupled to a storage device. The memory device may be divided into one or more dies, each of which may be further divided into one or more planes that are linked together. The number and configurations of planes within the flash die may be adaptable. Each plane may be further divided into blocks, wherein blocks without defects on which data may be written are described herein as good blocks. Blocks that have defects are described herein as bad/defective blocks. Some bad blocks may be default or factory-marked bad blocks and some bad blocks may be grown bad blocks (i.e., good blocks becoming bad over time). Grown bad blocks may be caused by any sort of electrical shorts between block lines, word lines, strings, or any other components on the memory device.

Consider an example where the memory device includes two 32 gigabytes (GB) dies, each of which includes two planes, the memory device may thus include die 0, with plane 0 and plane 1, and die 1, with plane 0 and plane 1. When the storage device performs a host write on the memory device, a meta block may be formed in an interleaved manner, wherein the meta block may include a good block from each plane. Using the example above, the storage device may write the host data to a meta block formed with good blocks on die 0-plane 0, die 0-plane 1, die 1-plane 0, and die 1-plane 1.

A die or plane may fail because of latent manufacturing defects that may occur due to grown bad blocks or factory-marked bad blocks. Memory devices typically do not mitigate die/plane failure due to bad blocks. When a die/plane no longer includes good blocks, the memory device may be unable to form a meta block and the memory device may enter a read-only mode. Users are currently not notified of the read-only mode prior to the memory device entering the read-only mode. Once the memory device enters the read-only mode, there is typically no way to recover from this state. The user may be unable to perform formatting operations and may be unable to write data to the memory device, even when there is free space on other dies/planes on the memory device that are not in a degraded state. When in the read-only mode, data that was previously written on the memory device before it entered the read-only mode may be retrieved.

SUMMARY

In some implementations, a storage device ensures the continued use of a first memory device when a die failure and/or a plane failure is pending on the first memory device. The storage device may be communicatively coupled to memory devices that include at least one die divided into planes that may be further divided into blocks. The controller may write host data to a meta block formed in an interleaved manner using good blocks in planes on a first memory device. A virtual space manager monitors dies and/or planes on the first memory device, determines that a number of remaining good blocks on a first die or a first plane is equal to a minimum block threshold, and sends a notification of a pending read-only mode on the first memory device. The notification includes an option to instruct the controller to cease to perform write operations to the meta block, backup data on the first memory device to a second memory device, format the first memory device at half capacity, form additional meta blocks, and perform host write operations to the additional meta blocks on the first memory device.

In some implementations, a method is provided for ensuring the use of a memory device when a die or plane failure is pending on the memory device. The method includes writing, by a controller in a storage device communicatively coupled to the memory device, host data to a meta block formed in an interleaved manner using good blocks in planes on the memory device. The method also includes monitoring, by a virtual space manager, dies and/or planes on the memory device, determining that a number of remaining good blocks on a first die or a first plane is equal to a minimum block threshold, and sending a notification of a pending read-only mode on the memory device. The notification includes an option to instruct the controller to perform write operations at half capacity on the memory device and to write host data to additional meta blocks formed in the interleaved manner using good blocks in the planes where the number of the remaining good blocks is greater than the minimum block threshold.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

Figure 1:
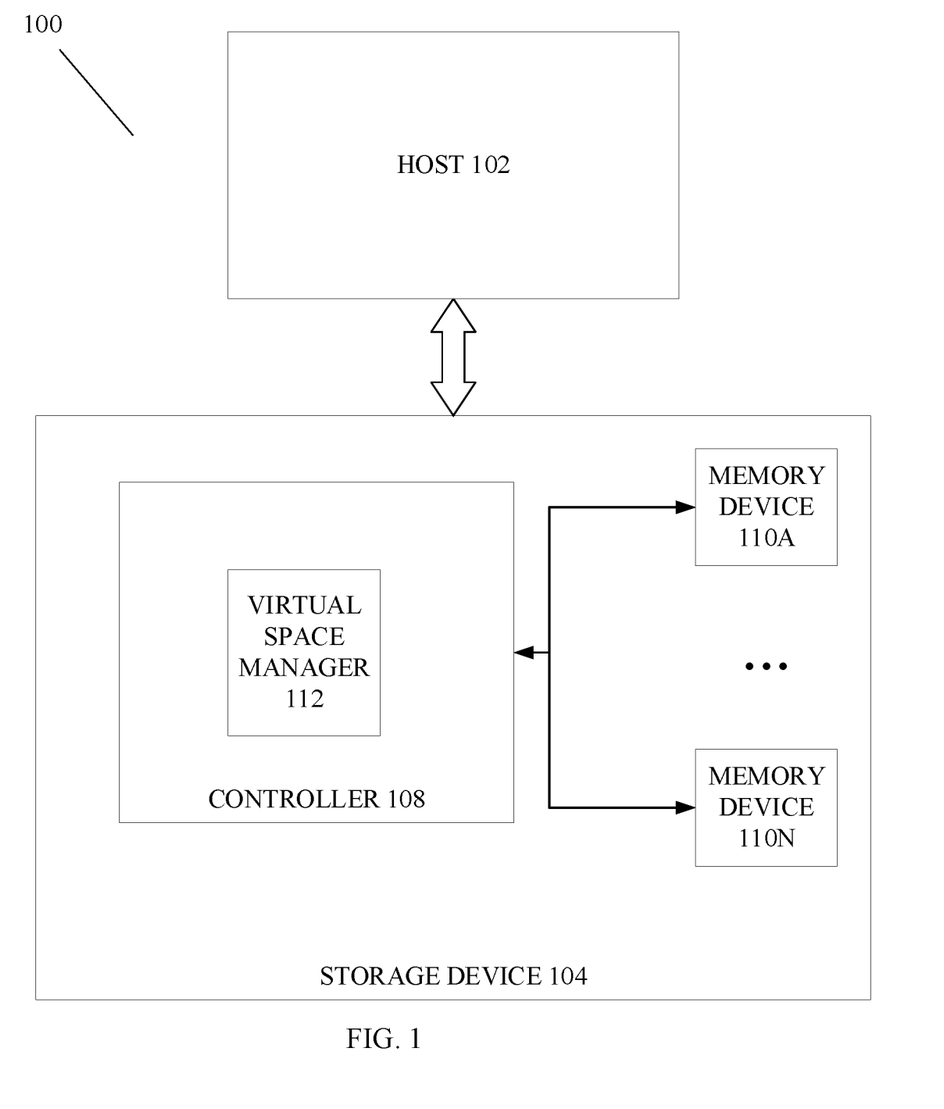
FIG. 1 is a schematic block diagram of an example system in accordance with some implementations.

FIG. 1 is a schematic block diagram of an example system in accordance with some implementations. System 100 includes a host 102 and a storage device 104. Host 102 may transmit commands to read or write data to storage device 104. Host 102 and storage device 104 may be in the same physical location as components on a single computing device or on different computing devices that are communicatively coupled. Storage device 104, in various embodiments, may be disposed in one or more different locations relative to the host 102. Host 102 may include additional components (not shown in this figure for the sake of simplicity).

Storage device 104 may include a controller 108, one or more memory devices 110a-110n (referred to herein as memory device(s) 110), and a virtual space manager 112. Storage device 104 may be, for example, a solid-state drive (SSD), and the like. Controller 108 may execute background operations to manage resources on memory device 110. For example, controller 108 may monitor memory device 110 and may execute garbage collection and other relocation functions per internal relocation algorithms to refresh and/or relocate the data on memory device 110. Controller 108 may also process foreground operations including instructions transmitted from host 102. For example, controller 108 may read data from and/or write data to memory device 110 based on instructions received from host 102.

Memory device 110 may be flash based, including, for example, NAND flash memory. Memory device 110 may be included in storage device 104 or may be otherwise communicatively coupled to storage device 104. Memory device 110 may include one or more dies, each of which may include one or more planes. The planes may be divided into blocks, some of which may be good blocks and some of which may be bad blocks. To write data to memory device 110, a meta block may be formed in an interleaved manner where each plane of each die is involved in carrying out a host write operation and the meta block may include a good block from each plane of each die. The planes may also include a few spare blocks, wherein the spare blocks may be used to continue functionality on memory device 110 when the good blocks in the planes are used up. When all good and/or spare blocks are used up on one of the planes, the plane may include only bad blocks. Memory device 110 may be unable to form a meta block due to the unavailability of good and/or spare blocks in each of the planes and may enter a read-only state. In the read-only state, memory device 110 may be unable to execute host write instructions and may not be formatted. Storage device 104 may read data previously written on memory device 110 when memory device 110 is in the read-only state.

When, for example, a first plane in memory device 110 has no good and/or spare blocks available but a second plane has spare blocks available, spare blocks from the second plane may be relinked to the first plane to manage operations on memory device 110. However, because the number of spare blocks allocated to each plane may be limited, memory device 110 may eventually exhaust all spare blocks from other planes and enter the read-only state.

In an example where memory device 110 has two dies (die 0 and die 1), each of which has two planes (plane 0 and plane 1), when die 0-plane 1 has no good and/or spare blocks available, die 0-plane 0, die 1-plane 0, and die 1-plane 1 may still have good and/or spare blocks available for use. Virtual space manager 112 may monitor the health of each plane/die for die and/or plane failure. Virtual space manager 112 may also monitor the health of each plane/die for word line and/or string mass defects. Virtual space manager 112 may set a minimum block threshold. When virtual space manager 112 detects that the number of available good blocks on a plane is equal to the minimum block threshold and that other planes have available good blocks above the minimum block threshold, virtual space manager 112 may notify firmware in storage device 104, host 102, and/or a user of a pending read-only mode on memory device 110, i.e., a notification that memory device 110 may soon enter the read-only mode. The notification from virtual space manager 112 may include a first option for controller 108 to continue to perform write operations in an interleaved manner on blocks from all the dies/planes in memory device 110, including the dies/planes where the number of remaining good blocks is equal to the minimum block threshold.

The notification may also include a second option for the user/host 102 to send controller 108 instructions to cease the host write operations, backup data stored on memory device 110 to another memory device (not shown) that is communicatively coupled to storage device 104, and format memory device 110 at half capacity. The second option breaks from performing the write operations in an interleaved manner on all dies/planes to performing the write operations in an interleaved manner on available dies/planes (i.e., dies/plane where the remaining good blocks are greater than the minimum block threshold) at half capacity. If the user/host 102 does not select the second option, storage device 104 may continue to perform host write operations on memory device 110 until memory device 110 enters a read-only mode. Virtual space manager 112 thus allows storage device 104 to provide an option for a user/host 102 to use the remaining space on memory device 110 in case of pending die/plane failures.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

FIGS. 2A-2E are block diagrams of an exemplary memory device used in accordance with some implementations. Memory device 110 may include two 32 GB dies, die-0 202a and die-1 202b, each of which includes two planes, plane-0 and plane-1 (referred to herein as planes 204a-204d). Planes 204a-204d may be divided into blocks 206a-206x (referred to herein generally as blocks 206), some of which may be good blocks and some of which may be bad blocks. To write data to memory device 110, a meta block 208 may be formed in an interleaved manner where good blocks in planes 204a-204d of die-0 202a and die-1 202b are involved in carrying out a host write operation. As such, meta block 208 may include a good block 206 from each of the planes 204a-204d. Planes 204a-204d may include a few spare blocks (shown as blocks 206w-206x), wherein spare blocks 206w-206x may be used to continue functionality on memory device 110 when the good blocks on an associate plane are used up.

Figure 2A:
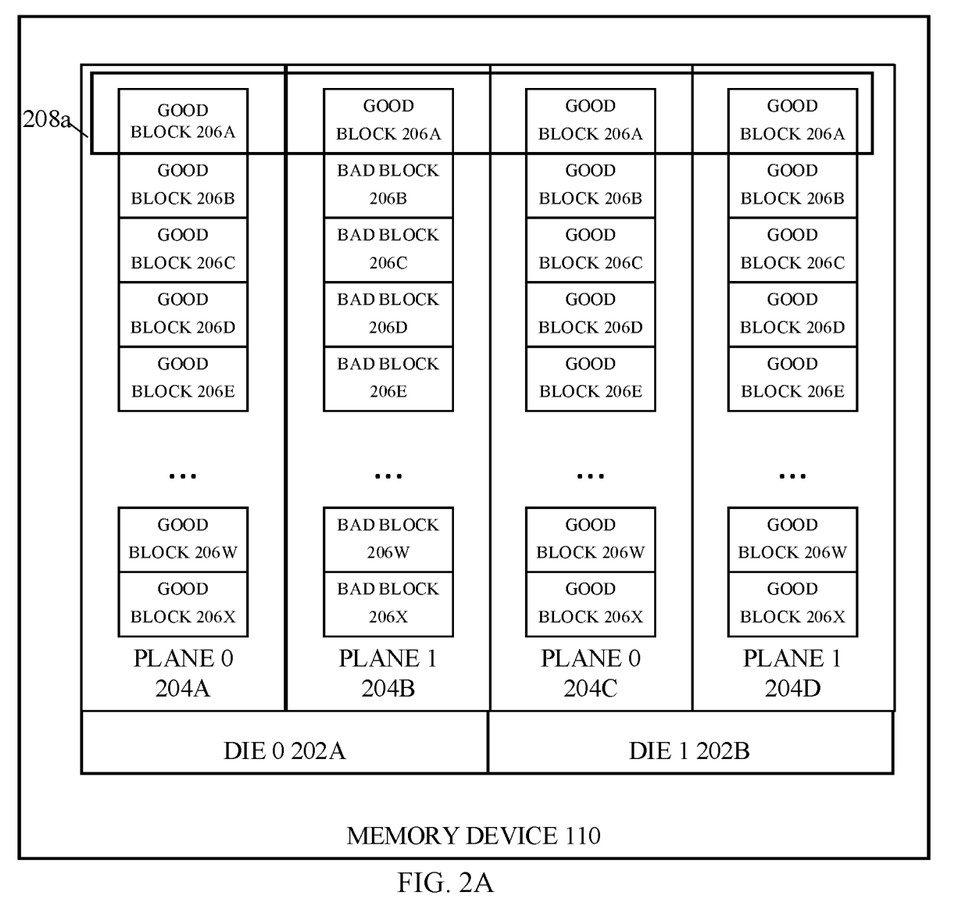
FIGS. 2A-2E are block diagrams of an exemplary memory device used in accordance with some implementations.

FIG. 2A shows an example where after meta block 208 is formed, all good and spare blocks are used up on plane 204b, and the remaining blocks on plane 204b are bad blocks. Memory device 110 may be unable to form additional meta block(s) 208 due to the unavailability of good blocks 206 in plane 204b and may be unable to further execute host write instructions. FIG. 2A shows a situation wherein memory device 110 may enter the read-only mode.

Figure 2B:
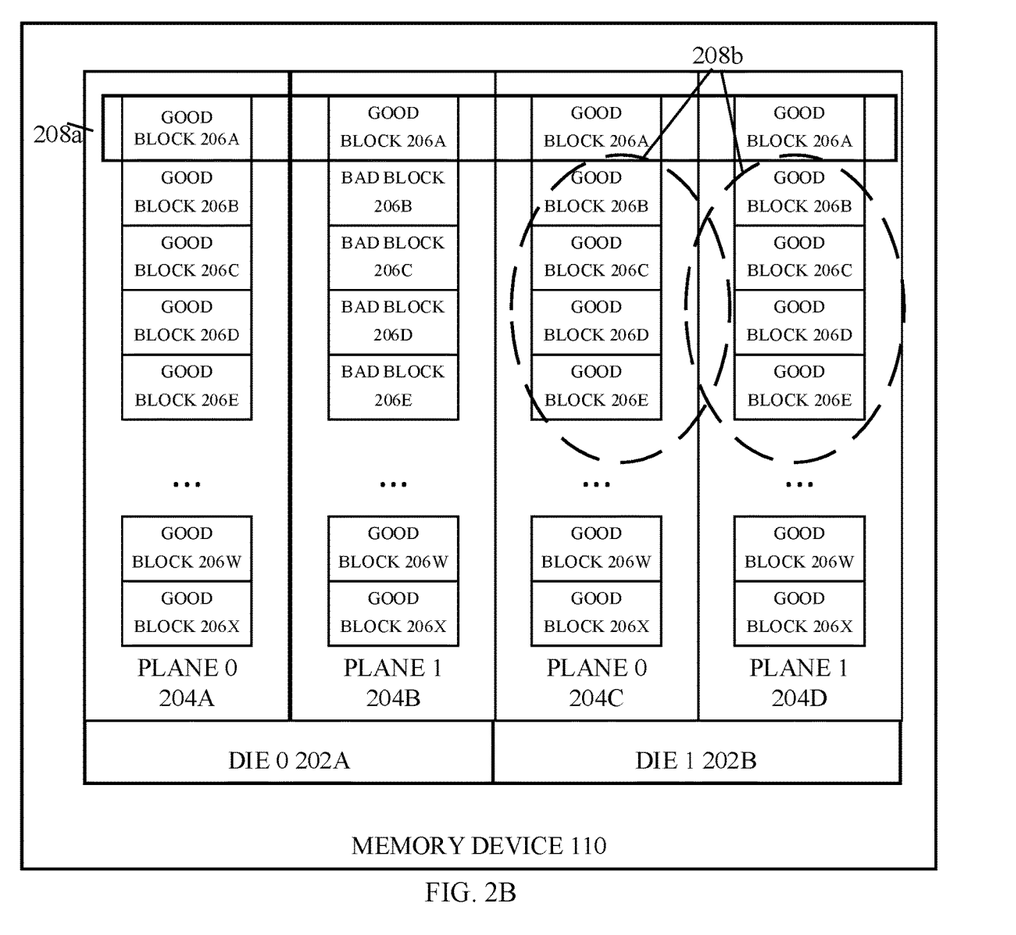

FIG. 2B shows an example where after meta block 208 is formed, a plane, for example, plane 204b is becoming defective and includes a few good/spare blocks, with some blocks on plane 204b being bad blocks. Virtual space manager 112 may monitor the health of each of planes 204a-204d and may determine that number of available/good blocks on plane 204b is equal to the minimum block threshold and that planes 204a, 204c, and 204d have good blocks above the minimum block threshold. Virtual space manager 112 may notify firmware in storage device 104 that plane 204b is in a degraded state and that memory device 110 may soon enter a read-only mode. Virtual space manager 112 may notify firmware in storage device 104 of the space available on planes 204c and 204d of die-1 202b. Storage device 104 may notify host 102 and/or a user of storage device 104 of the pending read-only mode of memory device 110 and of an option to cease the write operations, backup data stored on memory device 110, and format memory device 110 at half capacity such that additional meta blocks 208b may be formed in an interleaved manner where blocks on planes 204c and 204d of die-1 202b may be involved in carrying out future host write operations. The blocks to be used in forming meta block(s) 208b are circled in dashed ovals in FIG. 2B. If the user consents to the option presented, meta block(s) 208b may be formed from the blocks in planes 204c and 204d of die-1 202b and controller 108 may write host data to meta block(s) 208b. If the user does not consent to the option, when plane 204b uses up all good blocks 206, memory device 110 may enter the read-only mode.

Figure 2C:
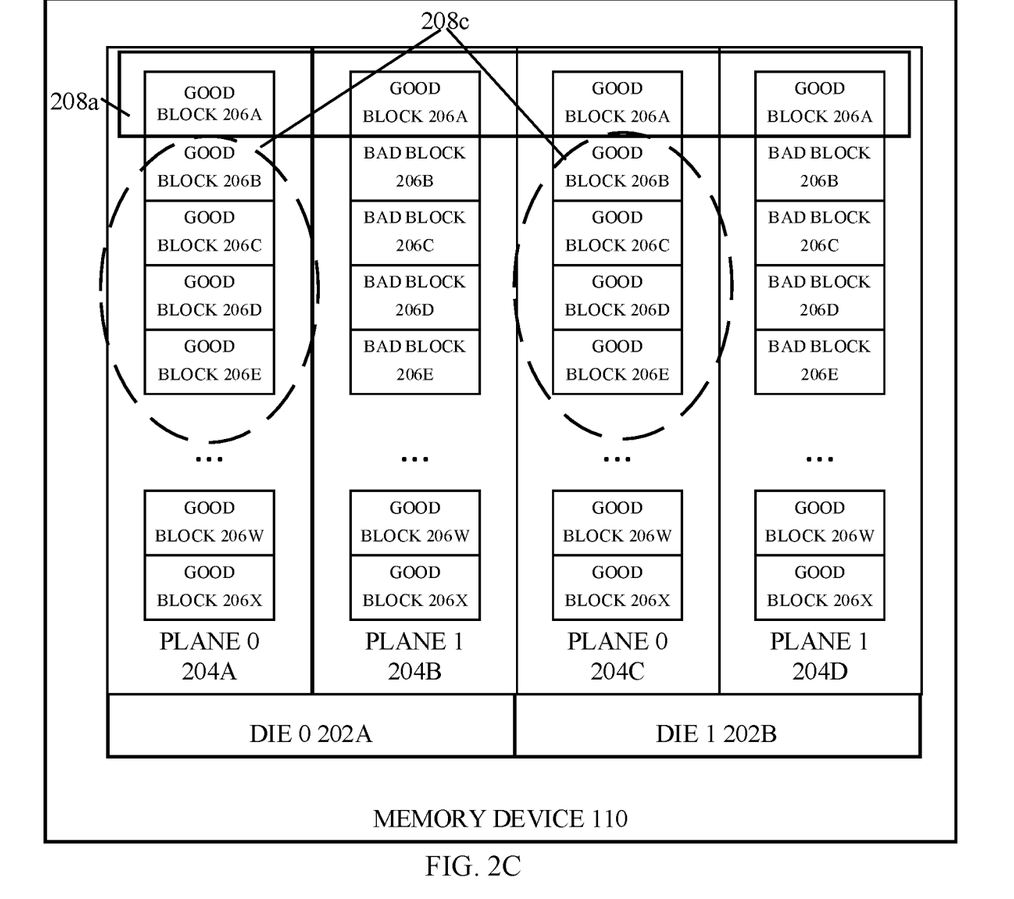

FIG. 2C shows another example where after meta block 208 is formed the same planes, for example, planes 204b and 204d on different dies, for example, die-0 202a and die-1 202b, are becoming defective and include a few good/spare blocks, with the remaining blocks on planes 204b and 204d being bad blocks. Virtual space manager 112 may monitor the health of each of planes 204a-204d and may determine that number of available/good blocks on planes 204b and 204d is equal to the minimum block threshold and that planes 204a and 204c have good blocks above the minimum block threshold. Virtual space manager 112 may notify firmware in storage device 104 that planes 204b and 204d are in a degraded state and that memory device 110 may enter a read-only mode. Virtual space manager 112 may notify firmware in storage device 104 of space available on plane 204a of die-0 202a and plane 204c of die-1 202b. Storage device 104 may notify host 102 and/or a user of storage device 104 of the pending read-only mode of memory device 110 and of an option to instruct controller 108 to cease the write operations, backup data stored on memory device 110, and format memory device 110 at half capacity. If the user/host 102 selects this option, meta blocks 208c may be formed in an interleaved manner where the blocks in planes 204a of die-0 202a and 204c and die-1 202b may be used in future host write operations. The blocks used in forming meta block(s) 208c are circled in dashed ovals in FIG. 2C. If the user does not consent to the option when plane 204b or plane 204d has no more good blocks 206, memory device 110 may enter the read-only mode.

Figure 2D:
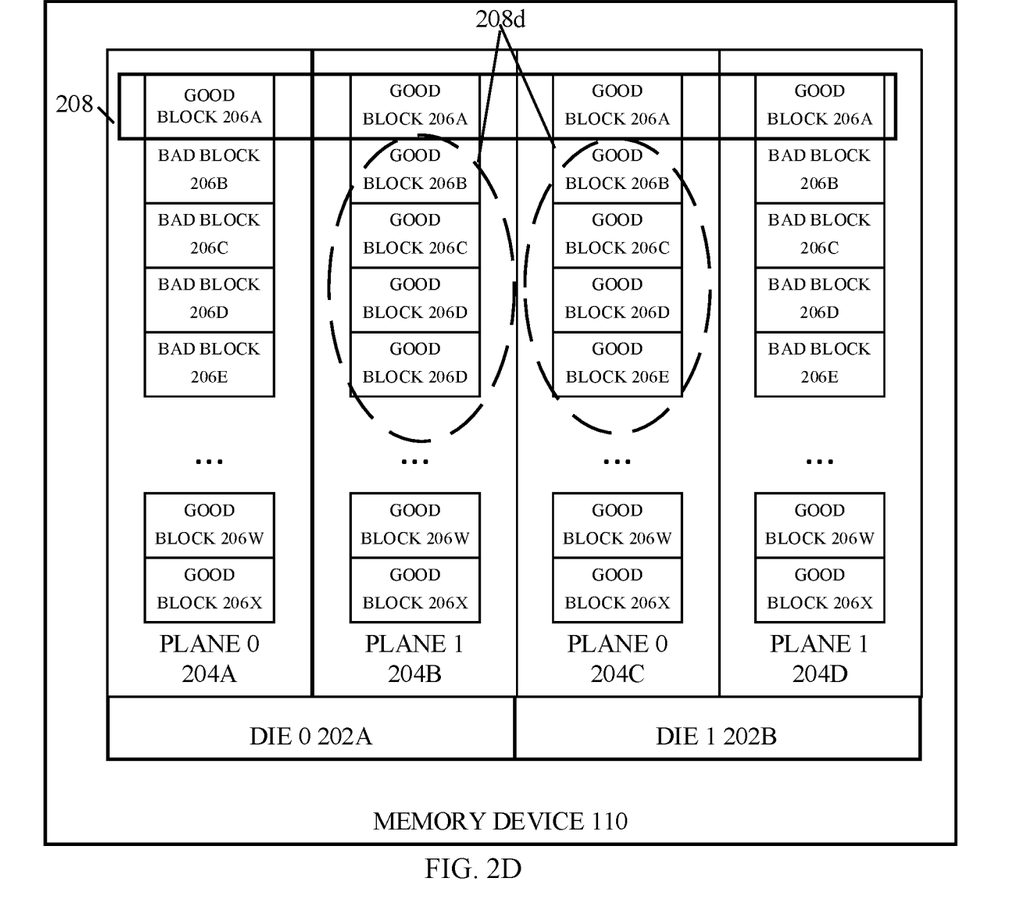

FIG. 2D shows another example where after meta block 208 is formed different planes, for example, planes 204a and 204d on different dies, for example, die-0 202a and die-1 202b, are becoming defective and include a few good/spare blocks, with the remaining blocks on planes 204a and 204d being bad blocks. Virtual space manager 112 may monitor the health of each of planes 204a-204d and may determine that number of available/good blocks on planes 204a and 204d is equal to the minimum block threshold and that planes 204b and 204c have good blocks above the minimum block threshold. Virtual space manager 112 may notify firmware in storage device 104 that planes 204a and 204d are in a degraded state and that memory device 110 may enter a read-only mode. Virtual space manager 112 may notify firmware in storage device 104 of space available on plane 204b of die-0 202a and plane 204c of die-1 202b. Storage device 104 may notify host 102 and/or a user of storage device 104 of the pending read-only mode of memory device 110 and of an option to cease the write operations, backup data stored on memory device 110, and format memory device 110 at half capacity such that meta blocks 208d may be formed in an interleaved manner where planes 204b of die-0 202a and 204c and die-1 202b may be involved in carrying out future host write operations. The blocks used in forming meta block(s) 208d are circled in the dashed ovals of FIG. 2D. If the user consents to the option presented, meta block(s) 208d may be formed, and if the user does not consent to the option, when plane 204a or 204d uses up all good blocks 206, memory device 110 may enter the read-only mode.

Figure 2E:
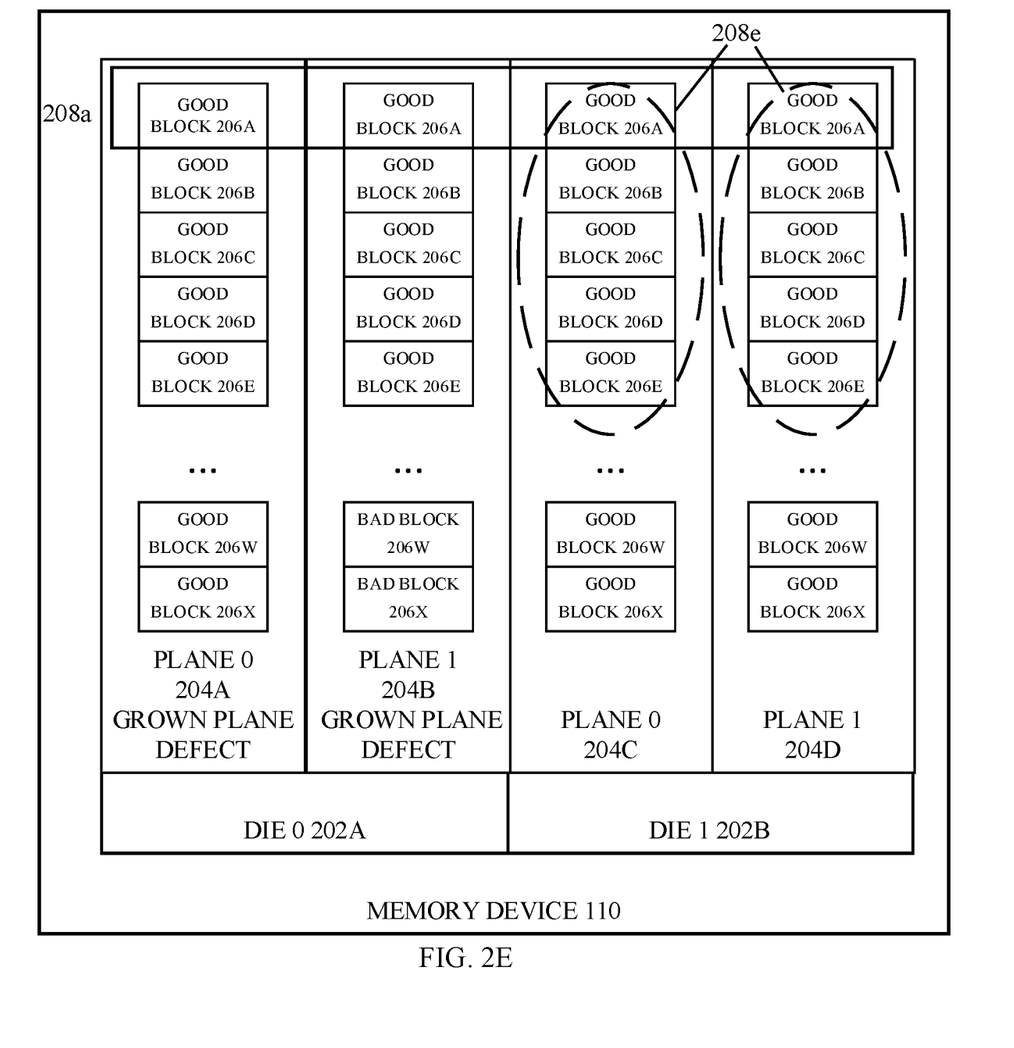

FIG. 2E shows another example where all planes, for example, planes 204a and 204b on a die, for example, die-0 202a, are becoming defective due to grown plane defects such that memory device 110 may enter read-only mode. Virtual space manager 112 may monitor the health of each of planes 204a-204d and may determine that planes 204a and 204b on die-0 202a are becoming defective due to grown plane defects and that planes 204c and 204d have good blocks above the minimum block threshold. Virtual space manager 112 may notify firmware in storage device 104 that planes 204a and 204b on die-0 202a are in a degraded state and that memory device 110 may enter a read-only mode. Virtual space manager 112 may notify firmware in storage device 104 of space available on plane 204c and 204d of die-1 202b. Storage device 104 may notify host 102 and/or a user of storage device 104 of the pending read-only mode of memory device 110 and of an option to cease the write operations, backup data stored on memory device 110, and format memory device 110 at half capacity. If the user/host 102 selects this option, meta blocks 208e may be formed in an interleaved manner where planes 204c and 204d may be used in carrying out future host write operations. The blocks used in forming meta block(s) 208e are circled in the dashed ovals of FIG. 2E. If the user does not consent to the option, when plane 204a or 204b becomes defective, memory device 110 may enter the read-only mode. As indicated above FIGS. 2A-2E are provided as examples. Other examples may differ from what is described in FIGS. 2A-2E.

In an implementation, virtual space manager 112 may monitor the health of each of the dies 202 and/or planes 204a-204d and may determine that all of planes 204a-204d are becoming defective due to grown plane defects. Virtual space manager 112 may notify firmware in storage device 104 that planes 204a-204d are in a degraded state and that memory device 110 may enter a read-only mode. Virtual space manager 112 may notify firmware in storage device 104 of the limited space on all the planes 204a-204d in memory device 110. Storage device 104 may notify host 102 and/or a user of storage device 104 of the pending read-only mode of memory device 110 and of an option to cease the write operations and backup data stored on memory device 110. If the user does not consent to the option when one of the planes 204a-204d becomes defective with no good block 206, memory device 110 may enter the read-only mode.

In some implementations, when virtual space manager 112 notifies firmware in storage device 104 of the limited space on one or more of planes 204a-204d in memory device 110, storage device 104 may be preconfigured to cease the write operations and backup data stored on memory device 110, for example, to the cloud or another memory device communicatively coupled to storage device 104, and to format memory device 110 at half capacity such that additional meta blocks may be formed on planes including good blocks in memory device 110. Storage device 104 may be configured to notify the user/host 102 before or after formatting memory device 110 at half capacity.

Figure 3:
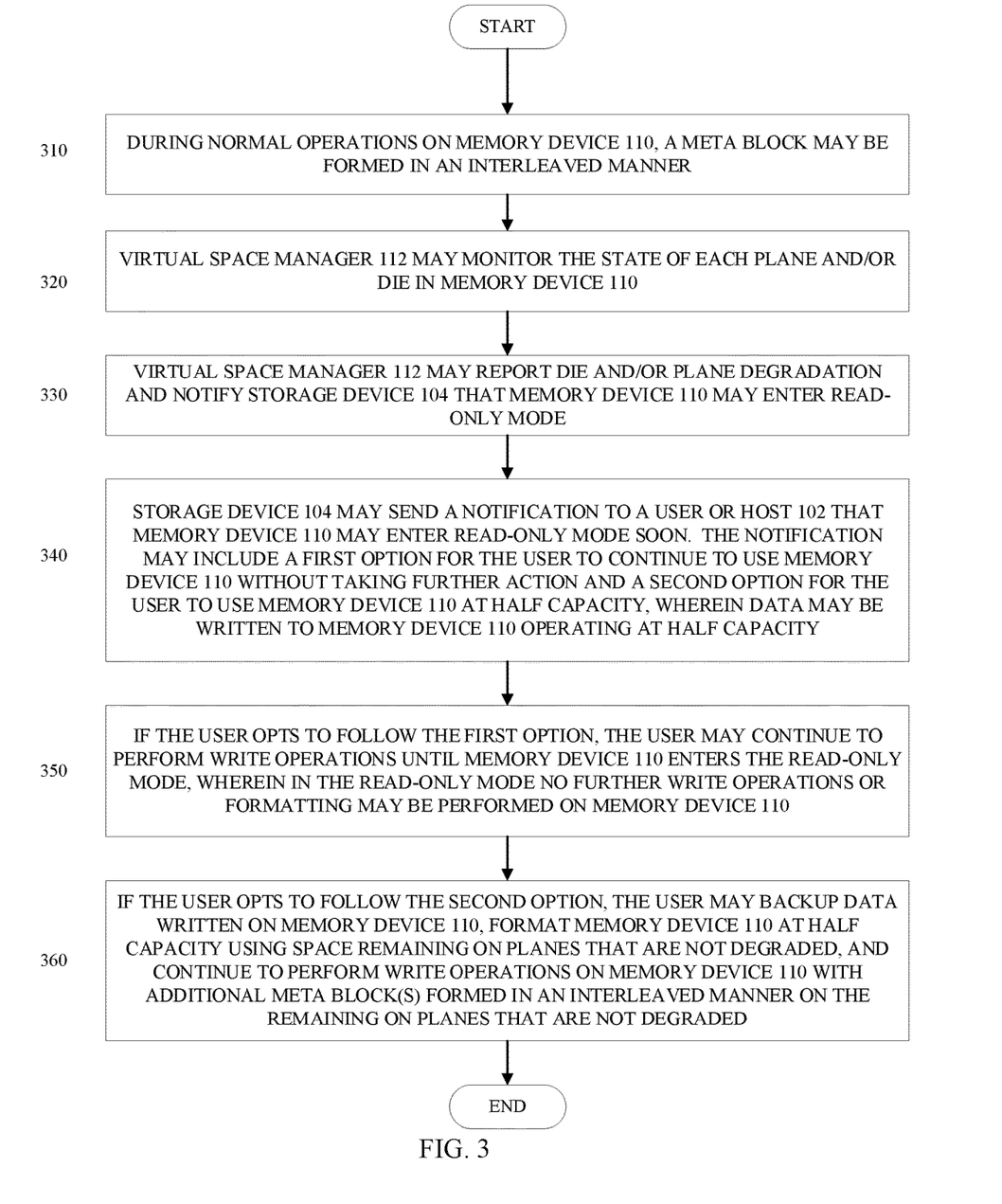
FIG. 3 is a flow diagram of an example process for enabling consistent performance and usability on a memory device when there is a die or plane failure in accordance with some implementations.

FIG. 3 is a flow diagram of an example process for enabling consistent performance and usability on a memory device when there is a die or plane failure in accordance with some implementations. At 310, during normal operations on memory device 110, a meta block may be formed in an interleaved manner. At 320, virtual space manager 112 may monitor the state of each plane and/or die on memory device 110. At 330, virtual space manager 112 may report die and/or plane degradation and notify storage device 104 that memory device 110 may enter read-only mode. At 340, storage device 104 may send a notification to a user or host 102 that memory device 110 may enter read-only mode soon. The notification may include a first option for the user to continue to use memory device 110 without taking further action and a second option for the user to use memory device 110 at half capacity, wherein data may be written to memory device 110 operating at half capacity. At 350, if the user opts to follow the first option, the user may continue to perform write operations until memory device 110 enters the read-only mode, wherein in the read-only mode no further write operations or formatting may be performed on memory device 110. At 360, if the user opts to follow the second option, the user may backup data written on memory device 110, format memory device 110 at half capacity using space remaining on planes that are not degraded and continue to perform write operations on memory device 110 with additional meta block(s) formed in an interleaved manner on the remaining on planes that are not degraded. As indicated above FIG. 3 is provided as an example. Other examples may differ from what is described in FIG. 3.

Figure 4:
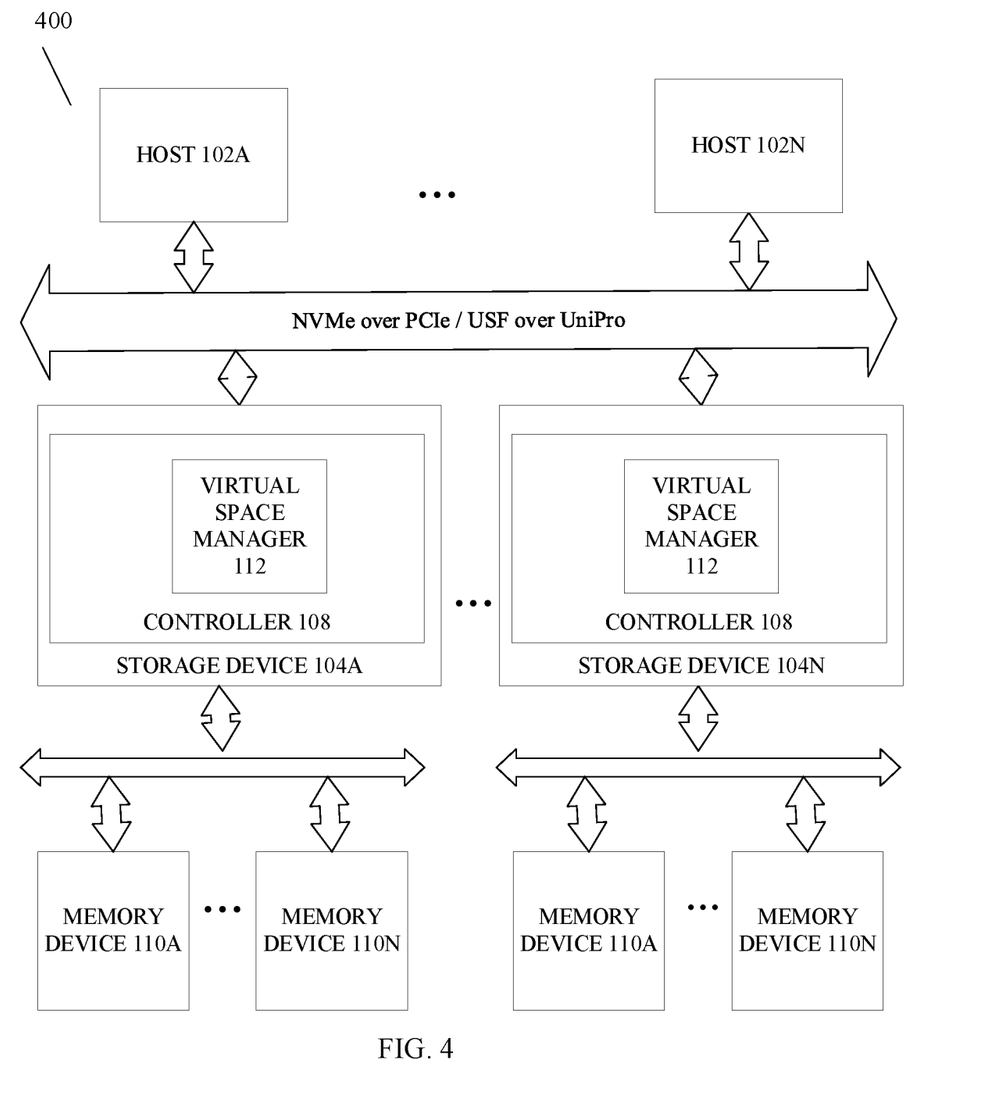
FIG. 4 is a diagram of an example environment in which systems and/or methods described herein are implemented.

FIG. 4 is a diagram of an example environment in which systems and/or methods described herein are implemented. As shown in FIG. 4, Environment 400 may include hosts 102-102n (referred to herein as host(s) 102), and storage devices 104a-104n (referred to herein as storage device(s) 104).

Storage device 104 may include a controller 108 to manage the resources on storage device 104. Controller 108 may include a virtual space manager 112 to monitor the state of components of memory device 110 and provide notification before memory device 110 enters a read-only mode, thus enabling consistent performance and usability on memory device 110 when there is a die or plane failure. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 400 may interconnect via wired connections, wireless connections, or a combination of wired and wireless connections. For example, the network of FIG. 4 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of Environment 400 may perform one or more functions described as being performed by another set of devices of Environment 400.

Figure 5:
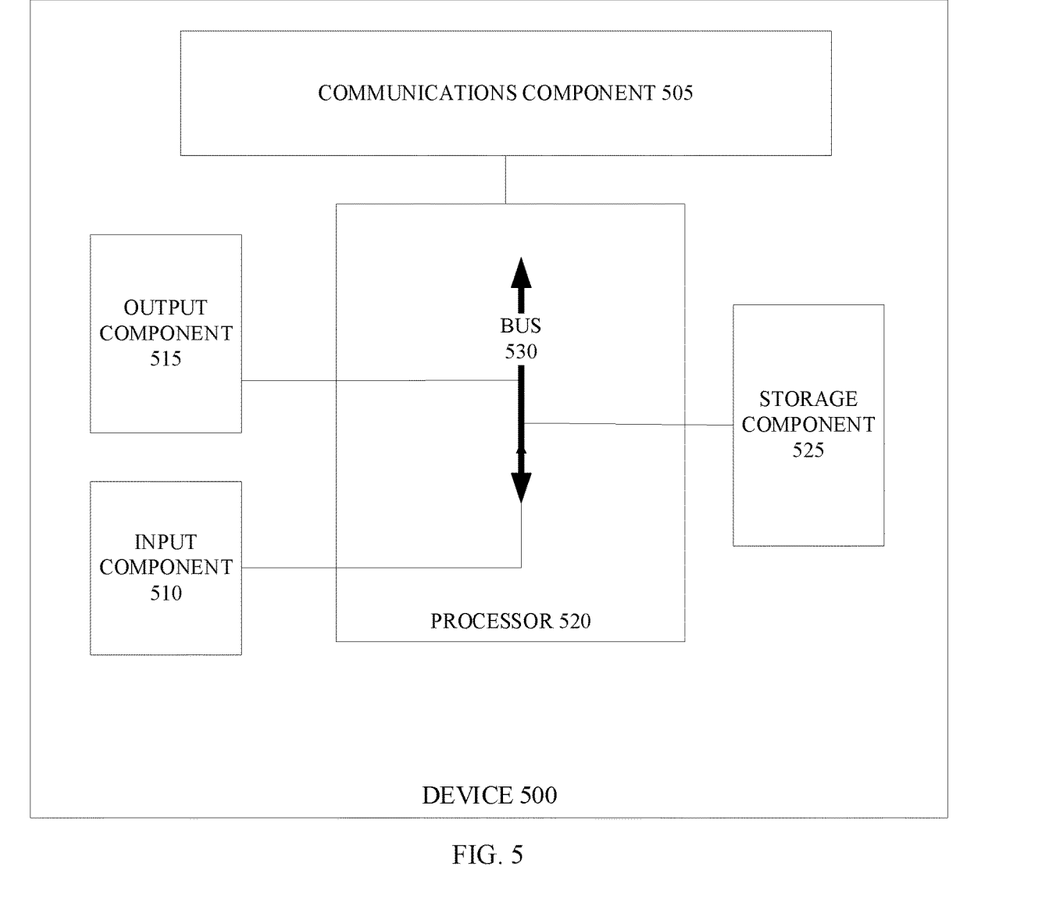
FIG. 5 is a diagram of example components of the host of FIG. 1.

FIG. 5 is a diagram of example components of one or more devices of FIG. 1. In some implementations, host 102 may include one or more devices 500 and/or one or more components of device 500. Device 500 may include, for example, a communications component 505, an input component 510, an output component 515, a processor 520, a storage component 525, and a bus 530. Bus 530 may include components that enable communication among multiple components of device 500, wherein components of device 500 may be coupled to be in communication with other components of device 500 via bus 530.

Input component 510 may include components that permit device 500 to receive information via user input (e.g., keypad, a keyboard, a mouse, a pointing device, a microphone, and/or a display screen), and/or components that permit device 500 to determine the location or other sensor information (e.g., an accelerometer, a gyroscope, an actuator, another type of positional or environmental sensor). Output component 515 may include components that provide output information from device 500 (e.g., a speaker, display screen, and/or the like). Input component 510 and output component 515 may also be coupled to be in communication with processor 520.

Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 may include one or more processors capable of being programmed to perform a function. Processor 520 may be implemented in hardware, firmware, and/or a combination of hardware and software.

Storage component 525 may include one or more memory devices, such as random-access memory (RAM) 114, read-only memory (ROM), and/or another type of dynamic or static storage device (e.g., a flash memory, a magnetic memory, and/or optical memory) that stores information and/or instructions for use by processor 520. A memory device may include memory space within a single physical storage device or memory space spread across multiple physical storage devices. Storage component 525 may also store information and/or software related to the operation and use of device 500. For example, storage component 525 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 505 may include a transceiver-like component that enables device 500 to communicate with other devices, such as via a wired connection, a wireless connection, or a combination of wired and wireless connections. The communications component 505 may permit device 500 to receive information from another device and/or provide information to another device. For example, communications component 505 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 505 may also include one or more broadband and/or narrowband transceivers and/or other similar types of wireless transceiver configurable to communicate via a wireless network for infrastructure communications. Communications component 505 may also include one or more local area network or personal area network transceivers, such as a Wi-Fi transceiver or a Bluetooth transceiver.

Device 500 may perform one or more processes described herein. For example, device 500 may perform these processes based on processor 520 executing software instructions stored by a non-transitory computer-readable medium, such as storage component 525. As used herein, the term "computer-readable medium" refers to a non-transitory memory device. Software instructions may be read into storage component 525 from another computer-readable medium or from another device via communications component 505. When executed, software instructions stored in storage component 525 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more" Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to ensure continued use of a memory device when at least one of a die failure or a plane failure is pending on the memory device, the storage device comprises:

a memory device including at least one die including at least one plane divided into blocks;

a controller to write host data to a meta block formed in an interleaved manner using good blocks in planes on the memory device; and a virtual space manager to monitor at least one of the dies and the planes on the memory device, determine that a number of remaining good blocks on one of a first die and a first plane is equal to a minimum block threshold, and send a notification of a pending read-only mode on the memory device, wherein the notification includes an option to instruct the controller to perform write operations at half capacity on the memory device and to write host data to additional meta blocks formed in the interleaved manner using good blocks in the planes where the number of the remaining good blocks are greater than the minimum block threshold.

2. The storage device of claim 1, wherein the virtual space manager monitors at least one of the dies and the planes on the memory device for at least one of a word line and string mass defects.

3. The storage device of claim 1, wherein the blocks on a plane in the memory device include spare blocks used to continue functionality on the memory device when good blocks in the plane are used up.

4. The storage device of claim 1, wherein the blocks on a plane in the memory device include good blocks, wherein when the first plane includes defective blocks and the good blocks and spare blocks on the first plane are used up, the additional meta blocks are not formed with blocks in the first plane.

5. The storage device of claim 1, wherein the notification includes another option to continue to perform write operations to the meta block.

6. The storage device of claim 1, wherein the virtual space manager monitors at least one of the dies and the planes on the memory device for at least one of die failure and plane failure.

7. The storage device of claim 1, wherein if the option is not selected the controller performs write operation to the meta block until the memory device enters a read-only mode.

8. The storage device of claim 1, wherein the additional meta blocks are formed in the interleaved manner using good blocks in the planes in a second die when the remaining good blocks in the first plane in the first die are equal to the minimum block threshold.

9. The storage device of claim 1, wherein the additional meta blocks are formed in the interleaved manner using good blocks in a second plane in the first die and a second plane in a second die when the remaining good blocks in the first plane in the first die and a first plane in the second die are equal to the minimum block threshold.

10. The storage device of claim 1, wherein the additional meta blocks are formed in the interleaved manner using good blocks in different planes on different dies.

11. A method for ensuring continued use of a memory device when at least one of a die failure or a plane failure is pending on the memory device, the method comprising:

writing, by a controller in a storage device communicatively coupled to a memory device, host data to a meta block formed in an interleaved manner using good blocks in planes on the memory device; and monitoring, by a virtual space manager, at least one of dies and the planes on the memory device;

determining, by the virtual space manager, that a number of remaining good blocks on one of a first die and a first plane is equal to a minimum block threshold; and sending, by the virtual space manager, a notification of a pending read-only mode on the memory device, the notification including an option to instruct the controller to perform write operations at half capacity on the memory device and to write host data to additional meta blocks formed in the interleaved manner using good blocks in the planes where the number of the remaining good blocks is greater than the minimum block threshold.

12. The method of claim 11, wherein the monitoring comprises monitoring at least one of the dies and the planes on the memory device for at least one of a word line and string mass defects.

13. The method of claim 11, further comprising forming the additional meta blocks without using blocks in the first plane when the first plane includes defective blocks and good blocks and spare blocks on the first plane are used up.

14. The method of claim 11, further comprising sending another option in the notification, the other option being to continue to perform write operations to the meta block.

15. The method of claim 11, wherein the monitoring comprises monitoring at least one of the dies and the planes on the memory device for at least one of a die failure and a plane failure.

16. The method of claim 11, further comprising continuing to perform write operations to the meta block until the memory device enters a read-only mode if the option is not selected.

17. The method of claim 11, further comprising forming the additional meta blocks using good blocks in planes in a second die when the remaining good blocks in the first plane in the first die are equal to the minimum block threshold.

18. The method of claim 11, further comprising forming the additional meta blocks using good blocks in a second plane in the first die and a second plane in a second die when the remaining good blocks in the first plane in the first die and a first plane in the second die are equal to the minimum block.

19. The method of claim 11, further comprising forming the additional meta blocks using good blocks in different planes on different dies.

20. A storage device to ensure continued use of a first memory device when at least one of a die failure or a plane failure is pending on the first memory device, the storage device is communicatively coupled to a plurality of memory devices including at least one die including at least one plane divided into blocks and the storage device comprises:

a controller to write host data to a meta block formed in an interleaved manner using good blocks in planes on the first memory device; and a virtual space manager to monitor at least one of the dies and the planes on the memory device, determine that a number of remaining good blocks on one of a first die and a first plane is equal to a minimum block threshold, and send a notification of a pending read-only mode on the first memory device, wherein the notification includes an option to instruct the controller to cease to perform write operations to the meta block, backup data on the first memory device to a second memory device, format the first memory device at half capacity, form additional meta blocks on the first memory device in the interleaved manner using good blocks in the planes where the number of the remaining good blocks is greater than the minimum block threshold, and perform host write operations to the additional meta blocks on the first memory device.

* * * * *